(12) United States Patent
Hemed et al.

(10) Patent No.: US 8,850,407 B2
(45) Date of Patent: Sep. 30, 2014

(54) TEST SCRIPT GENERATION (75) Inventors: Nir Hemed, Yehud (IL); Anna Leiba, Yehud (IL); Moshe Eran Kraus, Mazkeret Batya (IL); Ofra Pavlovitz, Ramat Gan (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 49 days.

(21) Appl. No.: 13/478,875

(22) Filed: May 23, 2012

(65) Prior Publication Data

US 2013/0318499 A1 Nov. 28, 2013

(51) Int. Cl.
*G06F 9/44* (2006.01)
*G06F 11/34* (2006.01)

(52) U.S. Cl.
CPC .................. *G06F 11/3447* (2013.01)
USPC ........................................ 717/131

(58) Field of Classification Search
CPC ............ G06F 7/78; G06F 8/00–8/78; G06F 9/44–9/455; G06F 11/36
USPC ................................. 717/100–178
See application file for complete search history.

(56) References Cited

U.S. PATENT DOCUMENTS

| | | | |
|---|---|---|---|
| 5,978,940 A * | 11/1999 | Newman et al. | 714/712 |
| 6,681,383 B1 * | 1/2004 | Pastor et al. | 717/126 |
| 6,701,514 B1 * | 3/2004 | Haswell et al. | 717/115 |
| 7,191,326 B2 * | 3/2007 | Louden et al. | 713/1 |
| 7,437,614 B2 * | 10/2008 | Haswell et al. | 714/38.13 |
| 7,676,508 B2 * | 3/2010 | Robert | 707/999.204 |
| 2005/0166094 A1 * | 7/2005 | Blackwell et al. | 714/38 |
| 2008/0092119 A1 * | 4/2008 | Sweis | 717/124 |
| 2010/0281467 A1 * | 11/2010 | Arteaga et al. | 717/126 |
| 2011/0202901 A1 * | 8/2011 | Givoni et al. | 717/125 |
| 2011/0296384 A1 * | 12/2011 | Pasternak | 717/124 |
| 2012/0159448 A1 * | 6/2012 | Arcese et al. | 717/124 |
| 2013/0042222 A1 * | 2/2013 | Maddela | 717/124 |

OTHER PUBLICATIONS

Vieira et al., Automation of GUI Testing Using a Model-driven Approach, 2006.*
Test Script Generator Sample, .NET Framework 3.5.*

* cited by examiner

*Primary Examiner* — Wei Zhen
*Assistant Examiner* — Zhan Chen (57) ABSTRACT

Disclosed herein are techniques for generating an automated testing script. A request for a performance evaluation of a computer program is accessed. Predetermined rules are used to determine which objects defined in the computer program should be triggered by a script executable by a testing application. The script is generated in accordance with the predetermined rules.

20 Claims, 5 Drawing Sheets

TEST SCRIPT GENERATION

BACKGROUND

Engineers use load testing to evaluate the performance of a computer program while being exposed to a heavy workload. Load testing is one of the final tests carried out before a software application is shipped to customers. A test engineer may attempt to understand how a human user would interact with the software application and devise a test plan to automate the human interaction therewith. Such automation may be conducted with a software testing tool, such as LoadRunner distributed by Hewlett-Packard.

A test engineer may use load testing software to interact with a computer program and record those interactions in an automated testing script. Such a script may be replayed as many times as needed to evaluate the performance of the program. In addition, multiple instances of these scripts may be executed in parallel to determine how the program reacts under stress. The final script may include functions that trigger objects in the computer program. However, some objects triggered by the functions may be irrelevant to a given test. For example, if the purpose of a test is to evaluate the performance of communications between a client and a server, objects that render a dialog box on the screen may be redundant. Therefore, many load testing applications allow users to manually filter out objects deemed irrelevant such that functions triggering these objects are not included in the script during the recording phase.

DETAILED DESCRIPTION

Introduction: As noted above, many load testing applications allow engineers to manually filter out objects deemed irrelevant to a given test. An object, as used herein, may be any data structure or routine included in the program being tested, such as .NET assembly, an interface, a namespace, a class, or a method. Unfortunately, manual filtering of such objects may be burdensome, repetitive, and time consuming. The test engineer is required to have advanced knowledge of the computer program's design and of the objects encoded therein. Furthermore, it may take multiple trial and error attempts before an engineer is able to configure a filter suitable for a given test. A filter that is unsuitable for a given test may result in a script that does not properly resemble real-time conditions, that does not compile and execute, or that is difficult to maintain and correlate.

In view of the foregoing, various examples disclosed herein provide a system, non-transitory computer-readable medium, and method to generate an automated testing script. In one example, a request for a performance evaluation of a computer program may be accessed. In another example, predetermined rules may be used to determine which objects defined in the computer program should be triggered by a script executable by a testing application. The script may be generated in accordance with the predetermined rules.

The techniques disclosed herein automatically generate an automated testing script that triggers objects relevant to a given test and substantially reduce the time needed to generate such a script. The computer apparatus, non-transitory computer-readable medium, and method disclosed herein also eliminate the need for detailed knowledge of a computer program's design. Thus, the script generated by the examples disclosed herein is easier to maintain and correlate. The aspects, features and advantages of the present disclosure will be appreciated when considered with reference to the following description of examples and accompanying figures. The following description does not limit the application; rather, the scope of the disclosure is defined by the appended claims and equivalents. The present disclosure is divided into sections. The first, labeled "Components," describes examples of various physical and logical components for implementing aspects of the disclosure. The second section, labeled "Operation," provides a working example of the computer apparatus, non-transitory computer-readable medium, and method. Finally, the section labeled "Conclusion" summarizes the disclosure.

Figure 1:
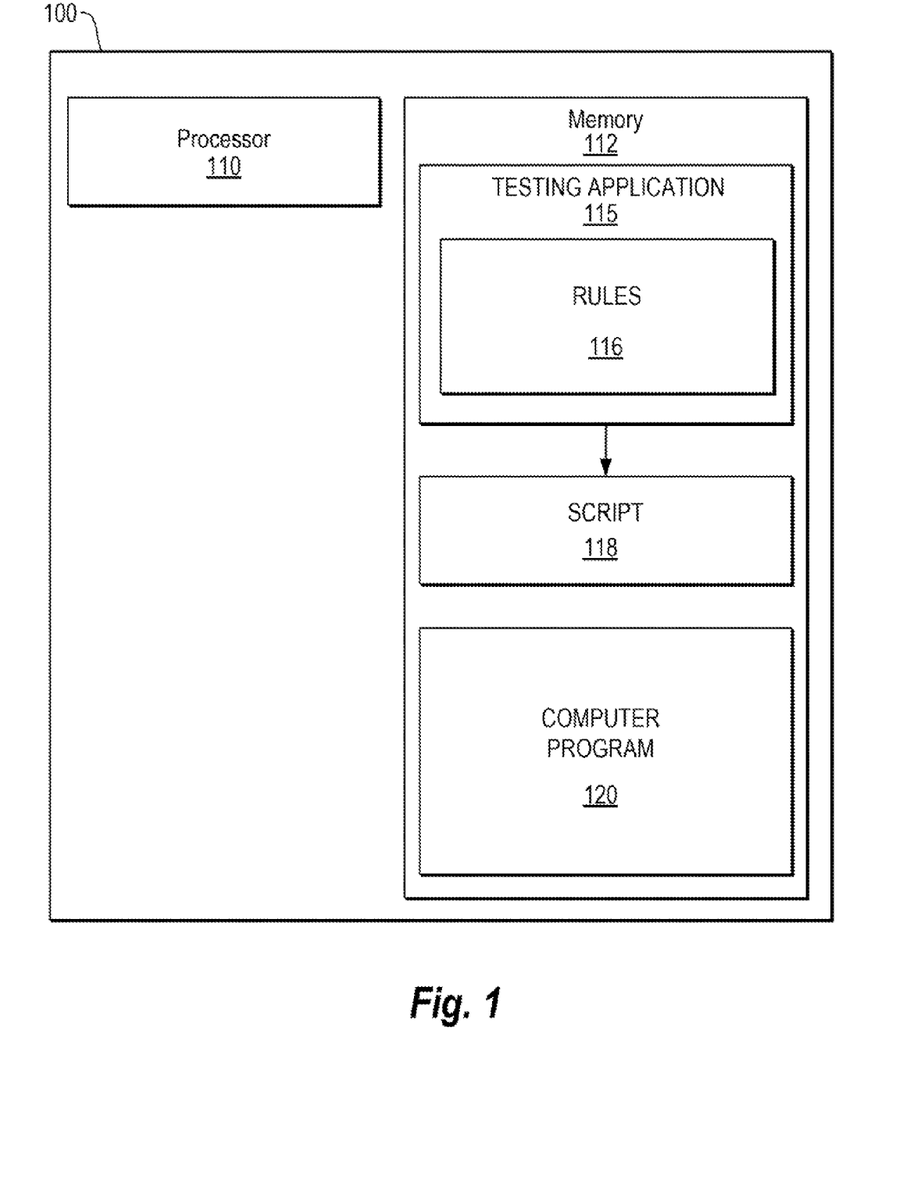
FIG. 1 is a block diagram of an example computer apparatus for enabling the test script generation techniques disclosed herein.

Components: FIG. 1 presents a schematic diagram of an illustrative computer apparatus 100 depicting various components in accordance with aspects of the present disclosure. The computer apparatus 100 may include all the components normally used in connection with a computer. For example, it may have a keyboard and mouse and/or various other types of input devices such as pen-inputs, joysticks, buttons, touch screens, etc., as well as a display, which could include, for instance, a CRT, LCD, plasma screen monitor, TV, projector, etc. Computer apparatus 100 may also comprise a network interface (not shown) to communicate with other devices over a network using conventional protocols (e.g., Ethernet, Wi-Fi, Bluetooth, etc.).

The computer apparatus 100 may also contain a processor 110 and memory 112. Memory 112 may store instructions that may be retrieved and executed by processor 110. In one example, memory 112 may be a random access memory ("RAM") device. In a further example, memory 112 may be divided into multiple memory segments organized as dual in-line memory modules (DIMMs). Alternatively, memory 112 may comprise other types of devices, such as memory provided on floppy disk drives, tapes, and hard disk drives, or other storage devices that may be coupled to computer apparatus 100 directly or indirectly. The memory may also include any combination of one or more of the foregoing and/or other devices as well. The processor 110 may be any number of well known processors, such as processors from Intel® Corporation. In another example, the processor may be a dedicated controller for executing operations, such as an application specific integrated circuit ("ASIC").

Although all the components of computer apparatus 100 are functionally illustrated in FIG. 1 as being within the same block, it will be understood that the components may or may not be stored within the same physical housing. Furthermore, computer apparatus 100 may actually comprise multiple processors and memories working in tandem.

The instructions residing in memory 112 may comprise any set of instructions to be executed directly (such as machine code) or indirectly (such as scripts) by the processor(s). In that regard, the terms "instructions," "steps," "applications" and "programs" may be used interchangeably herein. The instructions may be stored in any computer language or format. Furthermore, it is understood that the instructions may be implemented in the form of hardware, software, or a combination of hardware and software and that the examples herein are merely illustrative.

Testing application 115 may contain instructions therein that implement the techniques described in the present disclosure. In that regard, testing application 115 may be realized in any non-transitory computer-readable media for use by or in connection with an instruction execution system such as computer apparatus 100, an ASIC or other system that can fetch or obtain the logic from non-transitory computer-readable media and execute the instructions contained therein. "Non-transitory computer-readable media" may be any media that can contain, store, or maintain programs and data for use by or in connection with the instruction execution system. Non-transitory computer readable media may comprise any one of many physical media such as, for example, electronic, magnetic, optical, electromagnetic, or semiconductor media. More specific examples of suitable non-transitory computer-readable media include, but are not limited to, a portable magnetic computer diskette such as floppy diskettes or hard drives, a read-only memory ("ROM"), an erasable programmable read-only memory, or a portable compact disc.

Testing application 115 may configure processor 110 to record human interactions with a program being subjected to load testing, such as computer program 120. These interactions may be recorded as a series of functions in script 118, which may be executable by testing application 115. The recorded functions may trigger the same objects triggered during the recording phase. Testing application 115 may be any performance and load testing application for examining system behavior and performance while generating actual workload. One example of such application is the LoadRunner application distributed by Hewlett-Packard. However, it is understood that any appropriate network or load monitoring tool may be used and is considered to be within the scope of the present disclosure. In some implementations, the LoadRunner or other network monitoring application may emulate hundreds or thousands of concurrent users (or application instances) and/or transactions in order to collect information from infrastructure components.

Script 118 may be generated in accordance with rules 116. Such rules may be stored in computer registers, in a relational database as tables having a plurality of different columns and records, XML documents or flat files. Rules 116 may specify the type of activity that should or should not be triggered by script 118. Testing application 115 may automatically generate the script in accordance with rules 116 during the recording phase. Rules 116 may include any information sufficient to identify the rules, such as numbers, descriptive text, a proprietary language, references to rules stored in other areas of the same memory or different memories (including other network locations) or information that is used by a function to calculate the rules. Once generated, script 118 may be replayed repeatedly by testing application 115. The recorded functions may trigger objects that execute, for example, a mouse click, a keyboard entry, a receipt of data from another process or the transmission of data to a server.

Figure 2:
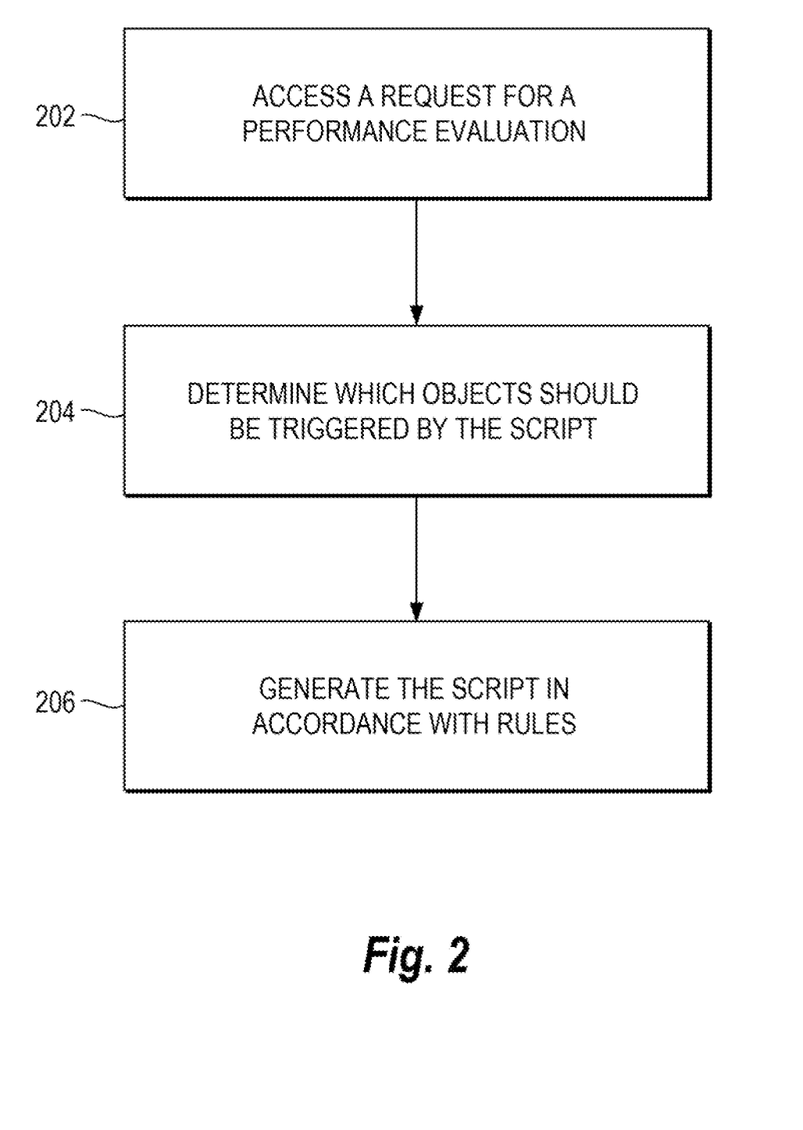
FIG. 2 is a flow diagram of an example method in accordance with aspects of the present disclosure.
Figure 3:
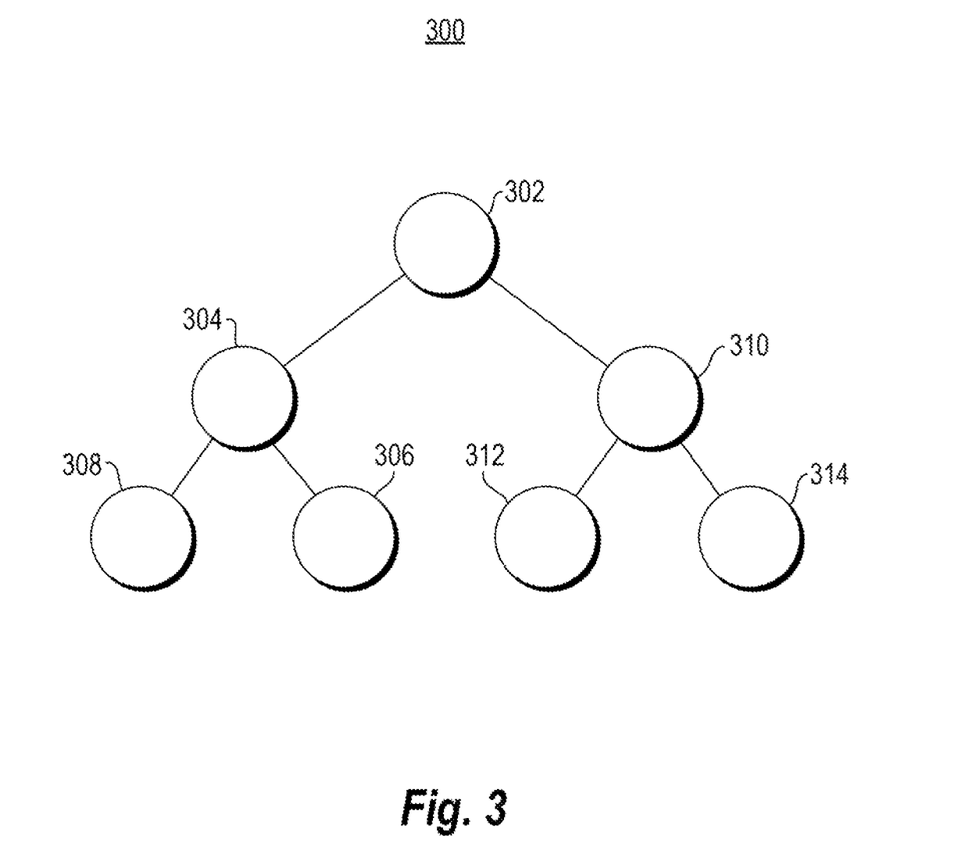
FIG. 3 is a working example of test script generation in accordance with aspects of the present disclosure.
Figure 4:
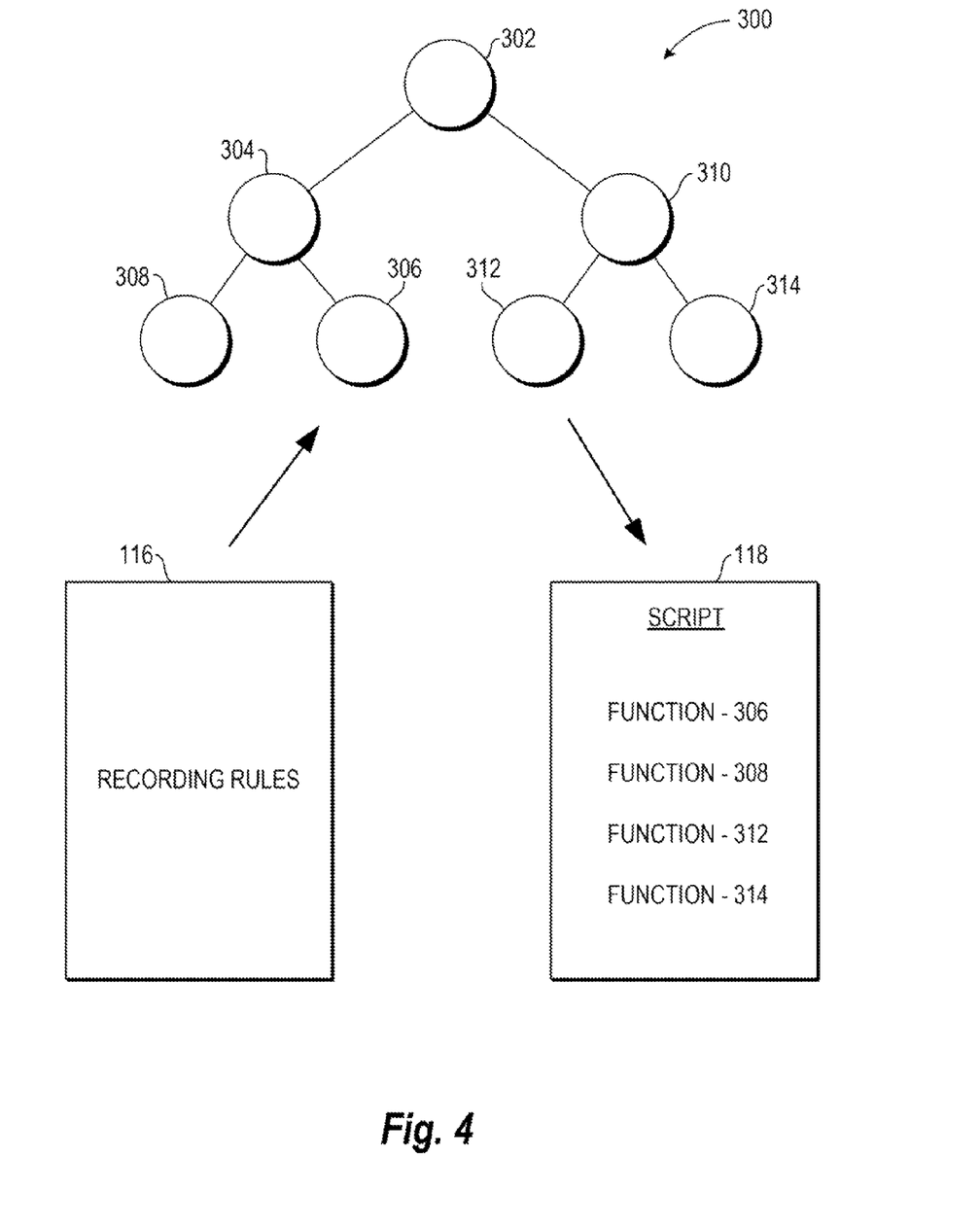
FIG. 4 is a further working example of test script generation in accordance with aspects of the present disclosure.
Figure 5:
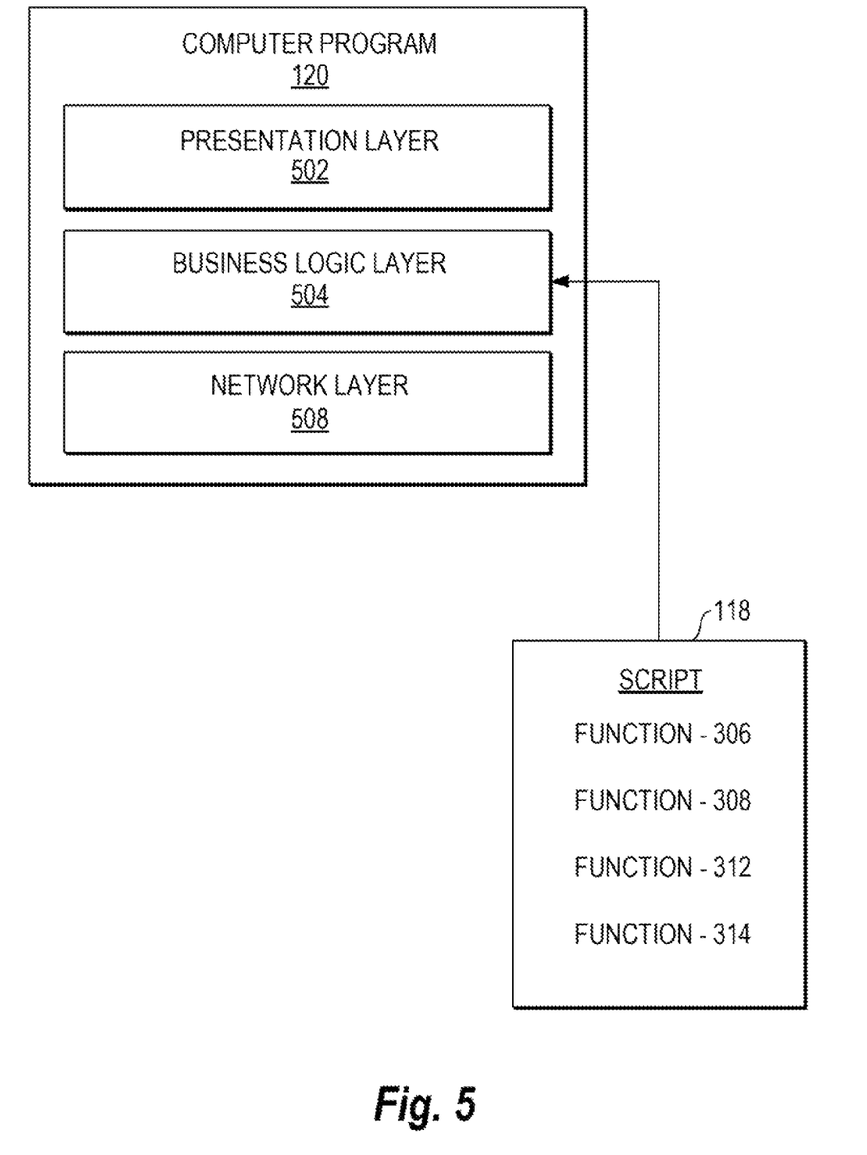
FIG. 5 is yet a further working example of test script generation in accordance with aspects of the present disclosure.

Operation: One working example of the apparatus and method is shown in FIGS. 2-5. In particular, FIG. 2 illustrates a flow diagram of an example method for automatically generating scripts in accordance with aspects of the present disclosure. FIGS. 3-5 show a working example of test script generation. The actions shown in FIGS. 3-5 will be discussed below with regard to the flow diagram of FIG. 2.

In FIG. 2, a request for a performance evaluation of a computer program may be accessed, as shown in block 202. A script executable by a testing application may be generated in response to the request. In block 204, the objects that should be triggered by the script may be determined based on predetermined rules, such as rules 116. Once this determination is made the functions that trigger the approved objects may be inserted into the script.

In determining the objects that should be triggered from the script, an entry point of the program being tested (e.g., computer program 120) may be determined. The entry point may be the main object from which all other objects of the program originate. FIG. 3 illustrates a hierarchical data structure 300 of interlinked nodes that may be generated and stored in memory 112 by testing application 115. The hierarchy of the data structure may reflect the hierarchy of the objects defined in the program being tested. While the hierarchical data structure 300 is shown as a binary tree, it is understood that any type of tree may be used, such as a B-tree. Each node 302, 304, 306, 308, 310, 312, and 314 may be associated with an object encoded in computer program 120. Node 302 is the root node and may be associated with the aforementioned entry point object. Each node in the hierarchical data structure 300 may be evaluated against the rules 116 so as to determine which objects should or should not be triggered by the functions in script 118.

In one example, the hierarchical data structure 300 may be processed using a breadth first search ("BFS") algorithm. Using a BFS strategy, the hierarchical data structure may be searched by visiting a node and evaluating the object associated with the node against the rules. If an object associated with a node satisfies the rules, any child nodes extending therefrom may also be deemed satisfactory. For example, if it is determined that the object associated with node 302 satisfies rules 116, then the entire tree may be deemed to satisfy the rules, since the objects associated with the lower ordered nodes may be traced back to the object associated with the root node. However, if node 302 does not satisfy the rules, node 310 may be evaluated. If it is determined that node 310 satisfies rules 116, then the child nodes thereof (i.e., node 312 and node 314) may also be deemed satisfactory. In turn, the BFS algorithm may next &valuate node 304 to determine whether it satisfies rules 116. If node 304 is satisfactory, the evaluation may terminate; otherwise, the child nodes thereof (i.e., node 308 and node 306) may be evaluated. In another example, a depth first search ("DFS") algorithm may be used that evaluates the lowest level nodes first (i.e. leaf nodes) and works its way up to the root node. The DFS approach may evaluate the objects associated with each visited node as it traces upward toward the root.

Referring back to FIG. 2, the script may be generated in accordance with the rules. As shown in FIG. 4, the nodes in the hierarchical data structure 300 may be evaluated against rules 116. In the example of FIG. 4, the objects associated with nodes 306, 308, 312, and 314 have been deemed satisfactory in view of the rules. As such, FIG. 4 is shown having a function corresponding to each satisfactory node that will trigger the objects associated therewith. Script 118 is shown in FIG. 4 with function_306, function_308, function_312, and function_314 encoded therein. Rules 116 may be exclusionary or inclusionary rules; thus, a function that triggers an object associated with a node satisfying an inclusionary rule may be added to the script. Conversely, a function that triggers an object associated with a node not satisfying an exclusionary rule may be added to the script.

In another example, rules 116 may have a default configuration such that the objects triggered by the resulting script belong to a logical layer in the computer program relevant to most testing scenarios. A logical layer may be a group of objects in computer program 120 that handle a particular task. The logical layer targeted by the default configuration of rules 116 may also be a layer whose output is readily comprehensible by a test engineer during a test. However, rules 116 may be configurable, which allows a test engineer to target any layer of the program being tested. Referring to FIG. 5, a detailed illustration of computer program 120 is depicted having three logical layers therein. First, there may be a presentation layer 502 whose role is to display a graphical user interface ("GUI") to a user and process any input therefrom. There may also be a business logic layer 504 that encompasses the logic specific to a particular business practice or business model. Finally, there may be a network layer 508 that focuses on communicating with other computers over a network. While FIG. 5 only shows three layers within computer program 120, it is understood that any number of layers may be implemented and that FIG. 5 is merely illustrative. The three layers may exchange information as necessary to execute computer program 120. Test engineers may try to target a logical layer relevant to their particular test. For example, if the logical layer is too high, such as presentation layer 502, and the purpose of a test is to evaluate client/server activity, the objects triggered in the presentation layer will not be relevant to this test. However, if the logical layer is too low, the information generated by the objects therein may not be readily comprehensible by a test engineer (e.g., the output of the objects are binary or hexadecimal codes). The example of FIG. 5 assumes that the purpose of the test is to evaluate client/server activity and script 118 is shown triggering objects in the business logic layer 504. In the business logic layer 504, a test engineer may be able to examine and interpret the activity between a client and the server during the test.

Conclusion: Advantageously, the above-described computer apparatus, non-transitory computer readable medium, and method automatically generate a script that triggers objects relevant to a given test. In this regard, the testing environment better reflects actual conditions. In turn, test engineers can focus on testing an application rather than learning the architecture thereof.

Although the disclosure herein has been described with reference to particular examples, it is to be understood that these examples are merely illustrative of the principles of the disclosure. It is therefore to be understood that numerous modifications may be made to the examples and that other arrangements may be devised without departing from the spirit and scope of the application as defined by the appended claims. Furthermore, while particular processes are shown in a specific order in the appended drawings, such processes are not limited to any particular order unless such order is expressly set forth herein. Rather, processes may be performed in a different order or concurrently.

What is claimed is:

1. A system for generating automated testing scripts, the system comprising a processor to:
    access a request for a performance evaluation of a computer program, having objects defined therein;
    identify on predetermined rules associated with a system behavior to be evaluated for performance;
    generate a hierarchical tree of interlinked nodes such that each node is associated with an object defined in the computer program;
    evaluate a node against the predetermined rules, the predetermined rules to specify the objects that should be triggered by a script executable be a testing application based on the system behavior; and
    generate the script to trigger objects associated with approved nodes in accordance with the predetermined rules.

2. The system of claim 1, wherein the predetermined rules target a logical layer of the computer program relevant to the purpose of the test and the object triggered by the script belong to the logical layer of the computer program.

3. The system of claim 1, wherein a hierarchy of the hierarchical tree of interlinked nodes reflects that of the defined in the computer program.

4. The system of claim 1, wherein the hierarchical tree of interlinked nodes is processed using a breadth first search.

5. The system of claim 1, wherein the predetermined rules are configurable by a user based on a task, the task associated with a system behavior.

6. A non-transitory computer readable medium having instructions stored therein which, when executed, cause a processor to:
    access a request for a performance evaluation of a computer program;
    generate a hierarchical tree of interlinked nodes in a memory, each node therein being associated with an object defined in the computer program;
    determine, using the hierarchical tree of interlinked nodes and a set of predetermined rules, which objects are relevant to a test purpose and should be triggered by a script executable by a testing application based on a system behavior to be evaluated by the performance evaluation; and
    insert a function associated with a task type into the script such that each inserted function triggers an object satisfying the predetermined rules associated with the system behavior.

7. The non-transitory computer readable medium of claim 6, wherein the object triggered by the function inserted in the script belong to a logical layer of the computer program that is relevant to the system behavior based on a role of the logical layer.

8. The non-transitory computer readable medium of claim 6, wherein a hierarchy of the hierarchical tree of interlinked nodes reflects that of the objects defined in the computer program.

9. The non-transitory computer readable medium of claim 8, wherein the instructions stored therein, when executed, further cause a processor to compare the task type associated with the object associated with each node in the hierarchical tree of the interlinked nodes against the system behavior so as to determine which objects should be triggered by the script.

10. The non-transitory computer readable medium of claim 9, wherein the instructions stored therein, when executed, further cause a processor to process the hierarchical tree of interlinked nodes using a breadth first search.

11. The non-transitory computer readable medium of claim 6, wherein the predetermined rules are configurable by a user based on a target layer of the computer program.

12. A method comprising:
    accessing, using a processor, a request for a performance evaluation of a computer program;
    generating, using the processor, a hierarchical tree of interlinked nodes in a memory, a node therein being associated with an object defined in the computer program such that a hierarchy of the hierarchical tree reflects that of objects defined in the computer program;
    comparing, using the processor, a task behavior of the object associated with each node in the hierarchical tree to predetermined rules based on a system behavior of the performance evaluation so as to determine which objects should be triggered by a script executable by a testing application; and inserting, using the processor, function to cause the task behavior into the script such that the inserted function triggers an object associated with the task behavior, the task behavior to satisfy the predetermined rules associated with the system behavior.

13. The method of claim 12, wherein the object triggered by the function inserted in the script belongs to a logical layer of the computer program that is relevant to the system behavior of the computer program to be evaluated.

14. The method of claim 12, wherein a hierarchy of the hierarchical tree of interlinked nodes reflects that of the objects defined in the computer program.

15. The method of claim 12, further comprising processing, using the processor, the hierarchical tree of interlinked nodes using one of a breadth first search and a depth first search.

16. The method of claim 12, further comprising finding, using the processor, an entry point in the computer program, the entry point being an object from which all other objects defined in the computer program originate.

17. The method of claim 12, further comprising generating the script during the recording phase, the script to be filtered of the function associated with the object at recording phase completion.

18. The method of claim 12, wherein comparing, using the processor, a task behavior of an object is performed on a child node when a parent node is associated with an approved object based on the predetermined rules.

19. The method of claim 12, further comprising extending, using the processor, an evaluation of a parent object based on the predetermined rules to a child object.

20. The method of claim 12, further comprising filtering, using the processor, a child object associated with a child node from the script when a parent object associated with a parent node is filtered based on the predetermined rules.

* * * * *

UNITED STATES PATENT AND TRADEMARK OFFICE
CERTIFICATE OF CORRECTION

PATENT NO. : 8,850,407 B2
APPLICATION NO. : 13/478875
DATED : September 30, 2014
INVENTOR(S) : Nir Hemed et al.

It is certified that error appears in the above-identified patent and that said Letters Patent is hereby corrected as shown below:

In the Claims

In column 5, line 58, in Claim 1, after "program," insert -- the computer program --, therefor.

In column 5, line 59, in Claim 1, after "identify" delete "on".

In column 5, line 66, in Claim 1, delete "be a" and insert -- by a --, therefor.

In column 6, line 6, in Claim 2, delete "object" and insert -- objects --, therefor.

In column 6, line 9, in Claim 3, before "defined" insert -- objects --.

In column 6, line 15, in Claim 5, delete "task ," and insert -- task, --, therefor.

In column 6, line 37, in Claim 7, delete "belong" and insert -- belongs --, therefor.

In column 6, line 48, in Claim 8, after "tree of" delete "the".

In column 6, line 66, in Claim 12, delete "each" and insert -- the --, therefor.

In column 7, line 4, in Claim 12, delete "function" and insert -- a function --, therefor.

Signed and Sealed this
Third Day of March, 2015

Michelle K. Lee
*Deputy Director of the United States Patent and Trademark Office*